(12) United States Patent
Kumar

(10) Patent No.: US 11,747,064 B2
(45) Date of Patent: Sep. 5, 2023

(54) INTEGRATED OIL SEPARATOR WITH FLOW MANAGEMENT

(71) Applicant: CARRIER CORPORATION, Palm Beach Gardens, FL (US)

(72) Inventor: Munish Kumar, Haryana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 323 days.

(21) Appl. No.: 17/115,091

(22) Filed: Dec. 8, 2020

(65) Prior Publication Data
US 2021/0302081 A1 Sep. 30, 2021

(30) Foreign Application Priority Data
Mar. 30, 2020 (IN) .............................. 202011013883

(51) Int. Cl.
F25B 43/02 (2006.01)
B01D 45/04 (2006.01)
B01D 46/56 (2022.01)
B01D 50/20 (2022.01)

(52) U.S. Cl.
CPC .............. *F25B 43/02* (2013.01); *B01D 45/04* (2013.01); *B01D 46/56* (2022.01); *B01D 50/20* (2022.01); *F25B 2400/02* (2013.01)

(58) Field of Classification Search
CPC ...... F25B 39/04; F25B 43/02; F25B 2400/02; F25B 2500/18; B01D 46/56
See application file for complete search history.

(56) References Cited

U.S. PATENT DOCUMENTS

| | | | |
|---|---|---|---|
| 1,522,903 A | 1/1925 | Pabodie | |
| 5,214,937 A * | 6/1993 | Henrichs | F04B 39/16 62/84 |
| 5,404,730 A | 4/1995 | Westermeyer | |
| 10,155,188 B2 | 12/2018 | Yoshioka et al. | |
| 10,527,331 B2 * | 1/2020 | Mullis | F25B 43/003 |
| 2008/0282726 A1 * | 11/2008 | Andersen | F25B 39/00 62/509 |
| 2011/0146215 A1 | 6/2011 | Lee et al. | |
| 2012/0125040 A1 | 5/2012 | Matsui | |
| 2017/0167764 A1 * | 6/2017 | Durrani | F25B 31/004 |
| 2018/0038618 A1 | 2/2018 | Hartfield et al. | |
| 2020/0191146 A1 | 6/2020 | Rinaldi et al. | |

FOREIGN PATENT DOCUMENTS

| | | |
|---|---|---|
| CN | 102242993 A | 11/2011 |
| CN | 203771832 U | 8/2014 |
| CN | 107144058 A | 9/2017 |
| EP | 2169332 A2 | 3/2010 |
| EP | 3006864 A1 | 4/2016 |
| WO | 2019146100 A1 | 8/2019 |

* cited by examiner

*Primary Examiner* — Lionel Nouketcha
(74) *Attorney, Agent, or Firm* — CANTOR COLBURN LLP

(57) ABSTRACT

An oil separator to separate oil from oil and refrigerant mixture. The oil separator includes inlets to allow entry of the oil and refrigerant mixture into the oil separator. The mixture flows and strikes on center of the one or more walls of the oil separator. The mixture then flows towards demister pads for filtration. The oil is separated from the mixture and exits the oil separator from the oil outlet. The refrigerant separated from the mixture escapes through the refrigerant outlet.

19 Claims, 10 Drawing Sheets

INTEGRATED OIL SEPARATOR WITH FLOW MANAGEMENT

FOREIGN PRIORITY

This application claims priority to Indian Patent Application No. 202011013883, filed Mar. 30, 2020, and all the benefits accruing therefrom under 35 U.S.C. § 119, the contents of which in its entirety are herein incorporated by reference.

TECHNICAL FIELD

The present invention generally relates to heating, ventilation, and air conditioning (referred hereinafter as "HVAC") system. More particularly, the invention relates to a system and method of flow management inside integrated oil separators in water-cooled heat exchangers.

BACKGROUND

Chillers generate chilled water which is used to provide air conditioning in buildings. Chillers operate on vapor compression refrigeration cycle and include compressors. Oil is used in compressors for lubrication, cooling, sealing, silencing (reducing pressure pulsation) & for auxiliary functions. Oil is mixed with the refrigerant in compressors. However, oil needs to be separated from the refrigerant to improve the reliability & efficiency of the refrigeration system. For the purpose of separation of the oil & refrigerant, oil separators are installed on the compressor discharge line before the condenser. They usually comprise of a vessel with the discharge gas (refrigerant & oil mixture) inlet connection/s, refrigerant gas outlet connection/s, and oil outlet connection/s. The separated refrigerant is supplied to condenser and separated oil is returned to the compressor.

In the existing internal oil separators, the oil and refrigerant mixture enters an inlet. The entry of the oil and refrigerant mixture from the inlet may happen from a single entry or a double entry in the oil separator at center of side walls. The oil is separated from the mixture by the virtue of collision of the oil and refrigerant mixture on the walls of the oil separator. The oil is further separated from the mixture due to gravity and the filtration through the wire meshes and demister pads in the oil separator. However, the flow of the oil and refrigerant mixture is not uniform as the oil and the refrigerant mixture strikes the walls and flow further towards the wire meshes/dimeter pads.

Current design throw refrigerant from center area and it goes all around directions toward extreme walls however inner area remains vacant because the flow travels along the side walls. Computational fluid dynamics (CFD) analysis on existing designs indicates problem with flow pattern, causing vortex and reverse flow in central portion. The space available inside is not properly getting utilized, flow distribution is not uniform as the Flow distribution index (FDI) is as low approx. 0.63~0.82 which is considered relatively poor.

The non-uniform flow of the oil and the refrigerant mixture at mesh/demister entrance effects the separation of the oil from the refrigerant and the oil particles may get carried away with the refrigerant. This in turn reduces the efficiency of the HVAC system and may lead to reliability and quality issues.

In view of the afore-mentioned problems, there is a need of an efficient and effective system and a method for providing a uniform flow to the oil and the refrigerant mixture inside the oil separator for uniform velocity at mesh entrance. There is also a need to increase the efficiency and reliability of the system while accomplishing the intended functions.

SUMMARY

Various embodiments of the invention describe an oil separator for separating oil from refrigerant associated with a condenser in a heating ventilation, and air conditioning (HVAC) system. The oil separator comprises one or more inlets for allowing oil and refrigerant mixture to enter inside the oil separator. The oil separator also comprises one or more walls defining ends of housing of the oil separator. The oil and the refrigerant mixture strike the one or more walls of the oil separator. The one or more walls comprise a plurality of intra-cut rings to deflect the mixture. The oil separator further comprises one or more demister pads within the housing of the oil separator to allow filtration of the oil from the mixture. The oil separator includes an oil outlet and a refrigerant outlet configured to allow separate flow of the oil and the refrigerant respectively from the oil separator.

In an embodiment of the invention, the oil separator is an integrated oil separator having a common dome with a condenser or separator is internal to condenser shell.

In a different embodiment of the invention, the one or more walls are configured to partially separate the oil from the mixture once the mixture strikes the one or more walls.

In an embodiment of the invention, the oil is further separated from the mixture by the virtue of gravity and filtration by the one or more demister pads.

In another embodiment of the invention, the plurality of intra-cut rings on the one or more walls are designed to allow uniform velocity of the mixture towards the one or more demister pads.

In yet another embodiment of the invention, the plurality of intra-cut rings are discontinuous along the circumference of each of the intra-cut rings.

In another embodiment of the invention, the thickness/height of each of the plurality of intra-cut rings are of different dimensions.

In still another embodiment of the invention, the discontinuities on the circumference of the intra-cut rings are of same dimensions.

In a different embodiment of the invention, the discontinuities on the circumference of the intra-cut rings are of different dimensions.

In another embodiment of the invention, the intra-cut rings are placed at an angle on the one or more walls.

In an embodiment of the invention, the intra-cut rings are circular or elliptical in shape.

In a different embodiment of the invention, the plurality of intra-cut rings are concentric with each other.

In yet another embodiment of the invention, the thickness/height of the circumference of each concentric intra-cut ring increases with increase in the diameter of each intra-cut ring.

Various embodiments of the invention describe a method of separating oil from the oil and refrigerant mixture in an oil separator. The method comprises allowing the oil and the refrigerant mixture to enter inside the oil separator. The ends of the oil separator are defined by one or more walls. The oil and refrigerant mixture is allowed to strike on the one or more walls. The one or more walls comprises plurality of intra-cut rings to deflect the mixture. The oil is further filtered using one or more demister pads within the housing of the oil separator. The oil and the refrigerant are allowed to flow separately via an oil outlet and a refrigerant outlet, respectively.

In another embodiment of the invention, the plurality of intra-cut rings are discontinuous along the circumference of each of the intra-cut rings and are designed to allow uniform velocity of the mixture towards the one or more demister pads.

In yet another embodiment of the invention, the plurality of intra-cut rings are concentric with each other. The thickness/height of each of the plurality of intra-cut rings are of different dimensions.

In another embodiment of the invention, the discontinuities on the circumference of the intra-cut rings are of same dimensions.

In an embodiment of the invention, the discontinuities on the circumference of the intra-cut rings are of different dimensions.

In another different embodiment of the invention, the intra-cut rings are placed at an angle on the one or more walls, wherein the intra-cut rings are circular or elliptical in shape.

In yet another embodiment of the invention, the thickness/height of the circumference of each concentric intra-cut ring increases with increase in the diameter of each intra-cut ring.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION

Described herein is a technology for an enhanced integrated oil separator within a condenser. In other words, the condenser is manufactured with an oil separator which is integrated within the condenser body. The integration of the oil separator within the body of the condenser is advantageous since the pressure difference between the flow of the fluid in the condenser and the oil separator is minimal. Moreover, this leads to saving the space of the entire system comprising the condenser.

As described herein, oil and refrigerant mixture from the compressor enters the integrated oil separator through an opening. It may be noted that the entry of the oil and refrigerant mixture (hereinafter "mixture") into the oil separator may be a single entry (only from one side) or may be a double entry (from two sides) into the oil separator. The flow of the mixture into the oil separator impinges on the one or more walls of the oil separator. In an exemplary embodiment, the mixture impinges at the center of the one or more walls of the oil separator. The heavier density oil separates from the mixture as first stage. The mixture further flows towards the demister pads and the oil is further separated from the mixture under the influence of gravity. The mixture is further filtered at the demister pads. The separated oil and the refrigerant flow through their respective outlets i.e., oil outlet and refrigerant outlet.

Various embodiments of the invention describe a plurality of embossed structures on one or more walls of the integrated oil separator. The embossed structures may be intra-cut rings having spaced apart opening within the bounded embossed structure (e.g. rings). The embossed structure may be of similar shape. The embossed structure allows the flow of the oil and refrigerant mixture regulated such that the mixture acquires a uniform flow through the integrated oil separator.

Experimental results indicate that to achieve maximum efficiency, ideal velocity of the mixture at the cross-section of demister pad should be 0.55 m/s. However, due to non-uniform flow of the mixture, the ideal velocity and the efficiency is not achieved. The embossed structures described herein provides a regulated flow to the mixture to achieve the desired efficiency.

Different features of the invention are described with reference to figures as described below.

Figure 1:
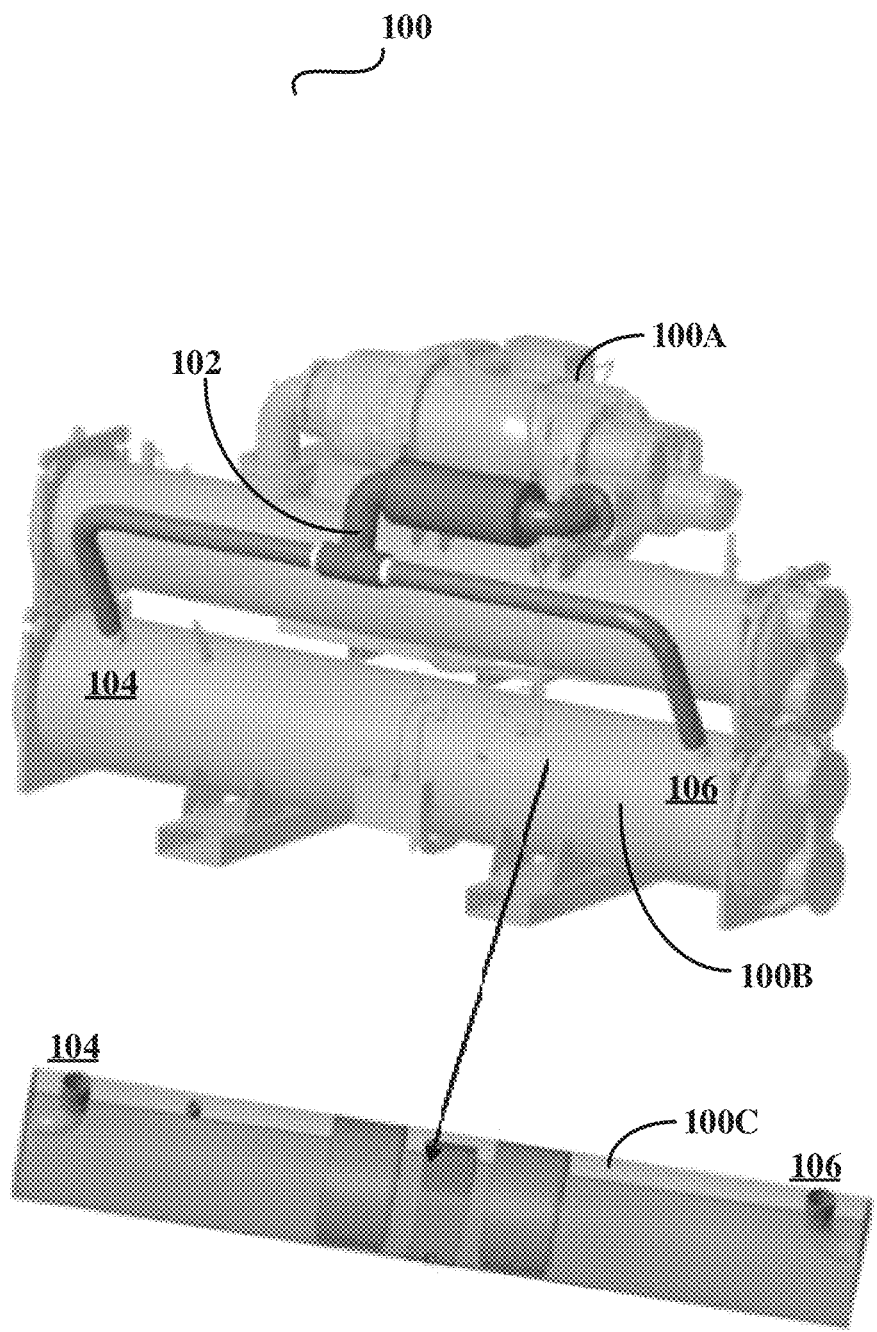
FIG. 1 depicts an exemplary condenser associated with a compressor with double entry integrated oil separator in a typical HVAC system according to an exemplary embodiment of the invention.

Turning now to Figures and drawings, FIG. 1 describes a typical subsystem 100 comprising a compressor 100A coupled with a condenser 100B in HVAC system. The condenser 100B is depicted with two entry points 104, 106 into the integrated oil separator from the compressor 100A via inlet 102. FIG. 1 further depicts top view of the condenser 100B where the transparent view of the integrated oil separator 100C is shown. The two entry points 104, 106 for the oil and refrigerant mixture from the compressor are also shown. The two entry points 104, 106 allows the mixture to flow into the oil separator where oil is separated from the mixture.

Figure 2:
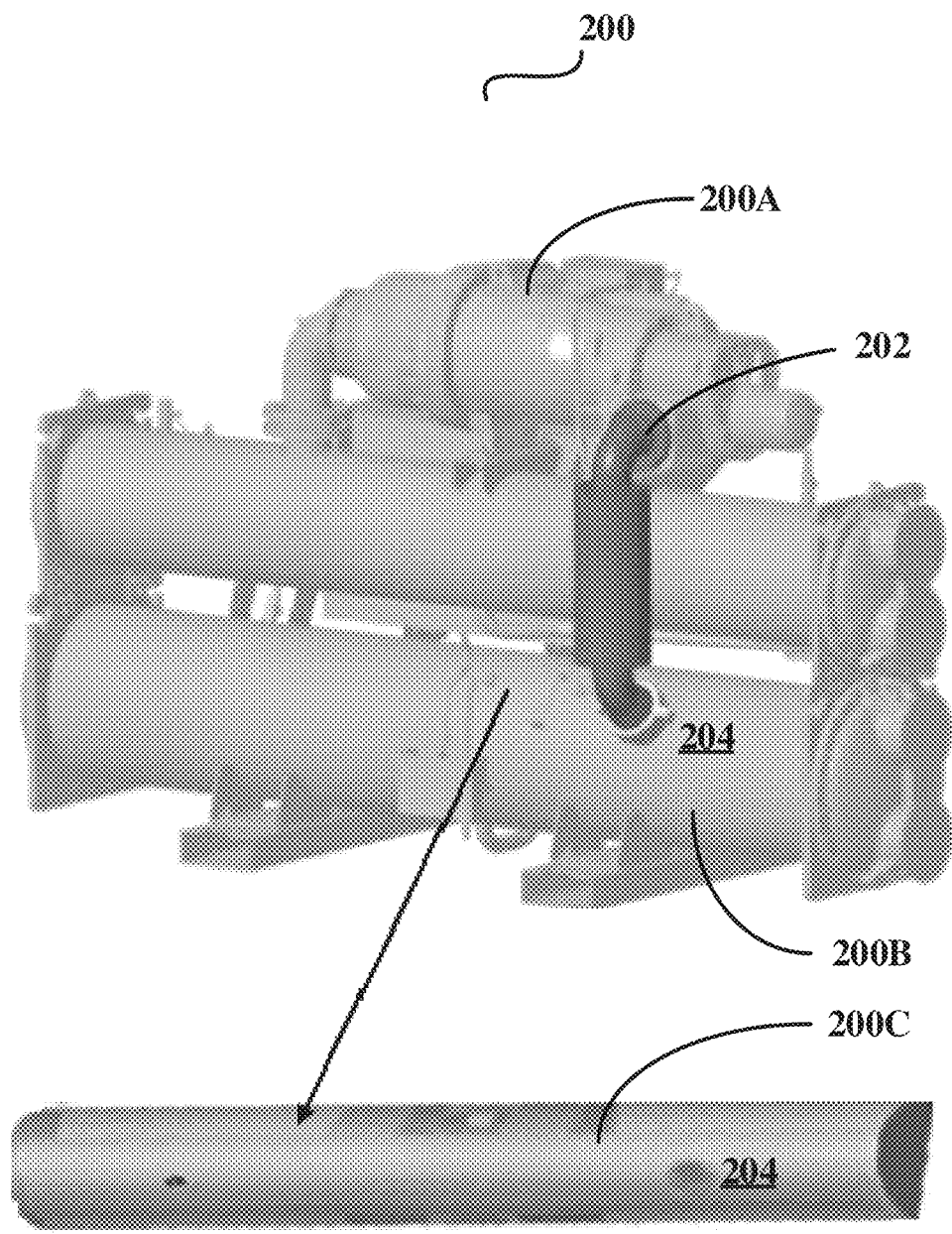
FIG. 2 depicts an exemplary condenser with a compressor with single entry integrated oil separator in a typical HVAC system according to an exemplary embodiment of the invention.

FIG. 2 depicts a typical subsystem 200 comprising a compressor 200A coupled with a condenser 200B in HVAC system. The condenser 200B is depicted with a single entry point 204 from inlet 202 (in compressor) into the integrated oil separator. FIG. 2 further depicts top view of the condenser 200B where the transparent view of the integrated oil separator is shown. The single entry point 204 for the oil and refrigerant mixture from the compressor are also shown. The single entry point 204 allows the mixture to flow into the oil separator where oil is separated from the mixture.

Figure 3:
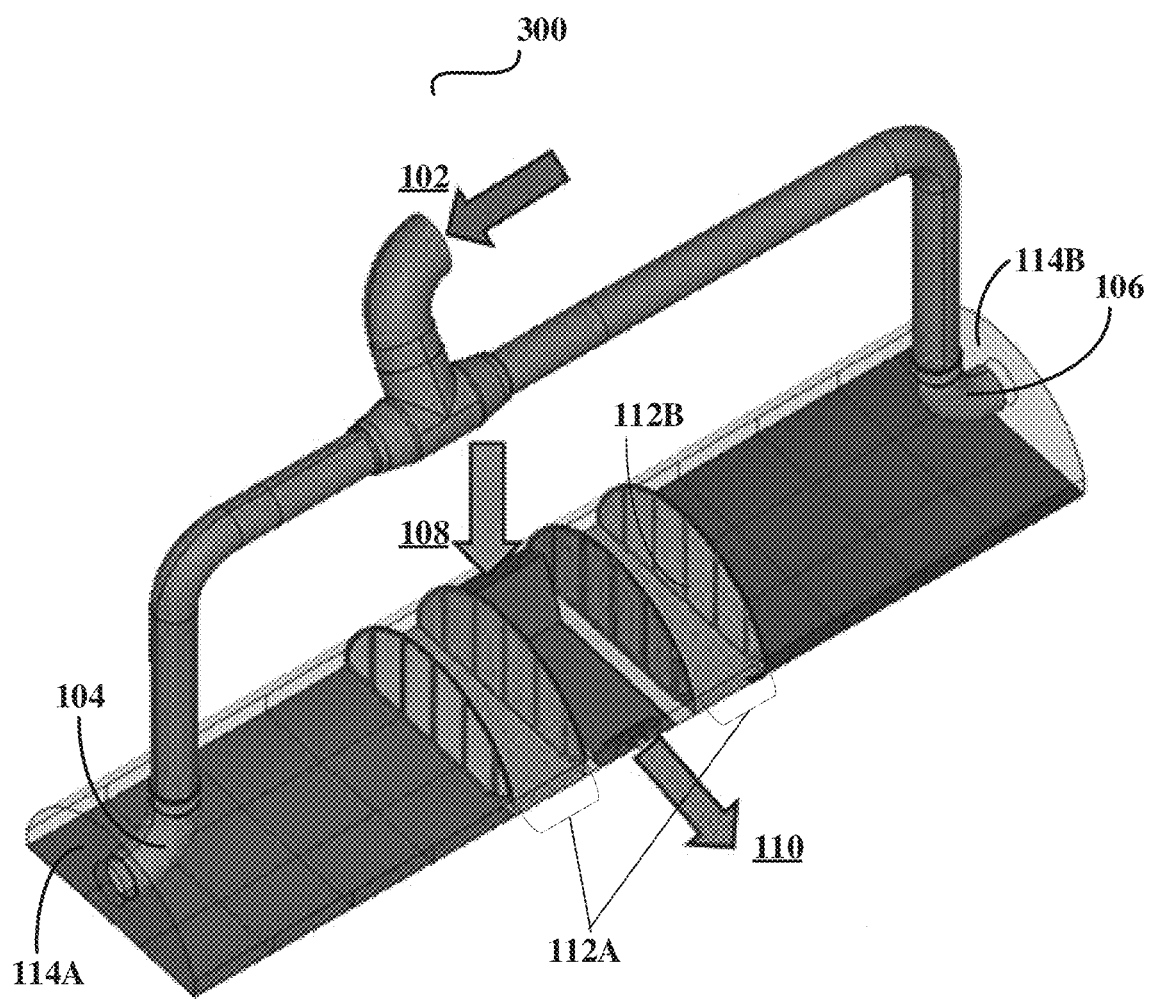
FIG. 3 depicts an integrated oil separator along with the components in accordance with an exemplary embodiment of the invention.

FIG. 3 depicts a typical integrated oil separator 300 shown in transparent view of FIG. 1. The working of the oil separator 300 with double entry points is explained. However, the working of the oil separator with single working point is similar to working of the double entry points oil separators and is within the scope of the invention. The mixture enters through inlet 102 and enters into the integrated oil separator from entry points 104 and 106 and strikes the walls 114A, 114B. The integrated oil separator 300 further comprises the demister pads 112A and the vertical brackets 112B. The filtered refrigerant flows through the refrigerant outlet 108 and the filtered oil is separated out from the oil outlet 110 from the bottom side of the oil separator. The vertical lines on the vertical brackets 112B are the imaginary lines and are depicted to identify different regions which are impacted by the flow of the mixture at the vertical brackets 112B.

Figure 4:
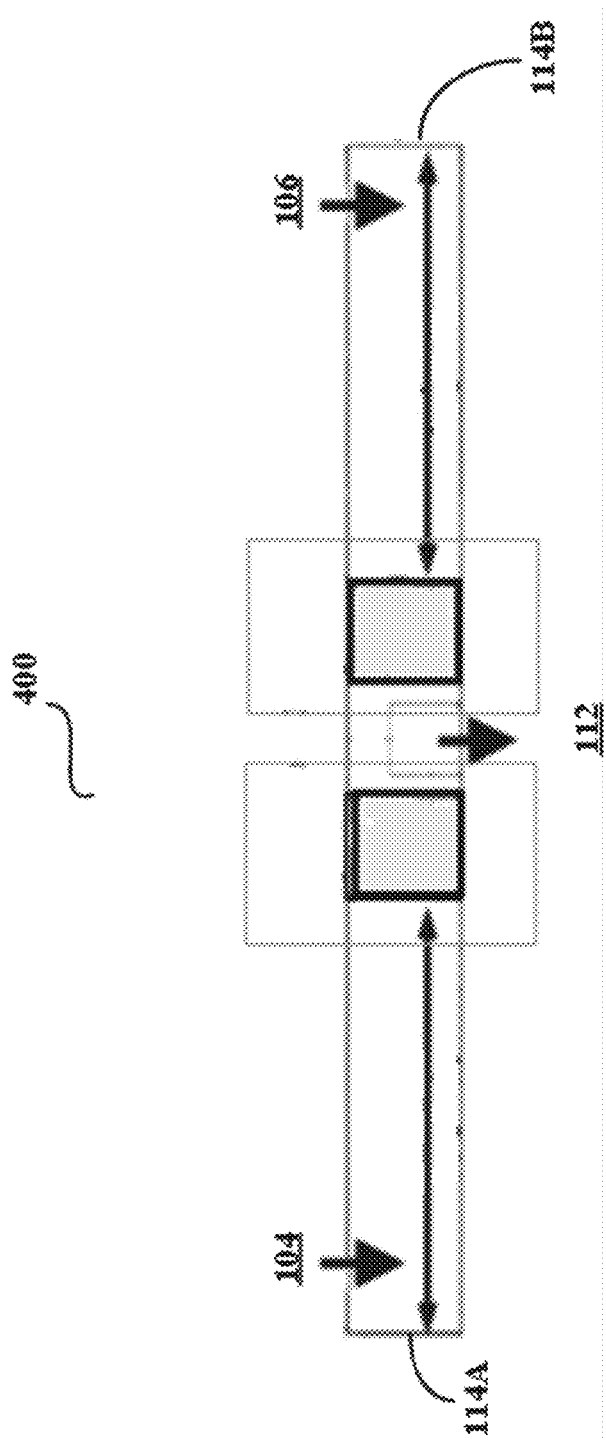
FIG. 4 depicts a process of separating oil from the integrated oil separator in accordance with an exemplary embodiment of the invention.

FIG. 4 depicts a typical separation mechanism of oil from the mixture of the oil and the refrigerant. As discussed above, the mixture enters the integrated separator from the entry points 104, 106 and strikes at one or more walls 114A and 114B. Firstly, the collision of the mixture with walls 114A and 114B allow the oil particles to separate from the mixture since the oil particles are heavier. The oil particles are separated from the mixture due to gravity as the mixture moves toward the mesh or demister pads after striking. Thirdly, the oil is separated finally by filtration at the mesh or demister pads 112 from both ends as shown in FIG. 4. Accordingly, the oil and the refrigerant from the mixture separate and escape through the oil outlet 110.

Figure 5:
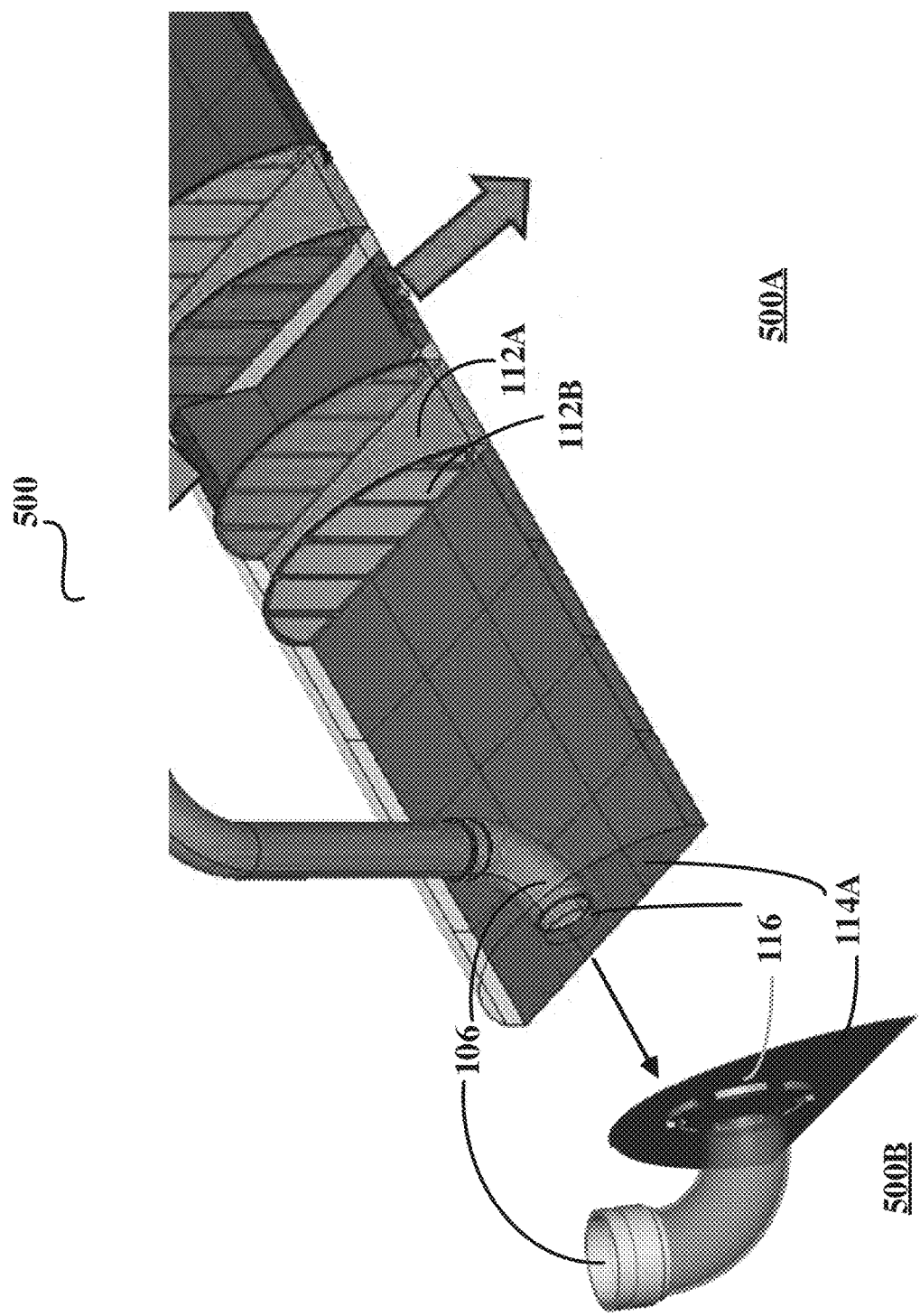
FIG. 5 depicts an exemplary structure of a wall of the integrated oil separator in accordance with an exemplary embodiment of the invention.

FIG. 5 depicts the exemplary embodiment of the present invention showing a front section 500 of the oil separator with the entry point 106 and the wall 114A. The mixture enters the oil separator through the entry point 106 and strikes the wall 114A as shown in 500A. FIG. 5 also depicts portion 500B showing details of the entry point 106 and the wall 114A. The wall 114A comprises an intra-cut ring 116 as shown in 500B. The intra-cut ring 116 is an embossed structure on the wall of the oil separator. The structure of the intra-cut ring 116 is such that the mixture is deflected at the intra-cut ring 116 as the mixture flows therethrough. The intra-cut ring 116 has discontinuities in the form of passages through the intra-cut ring, the function of the intra-cut 116 is explained below separately.

Figure 6:
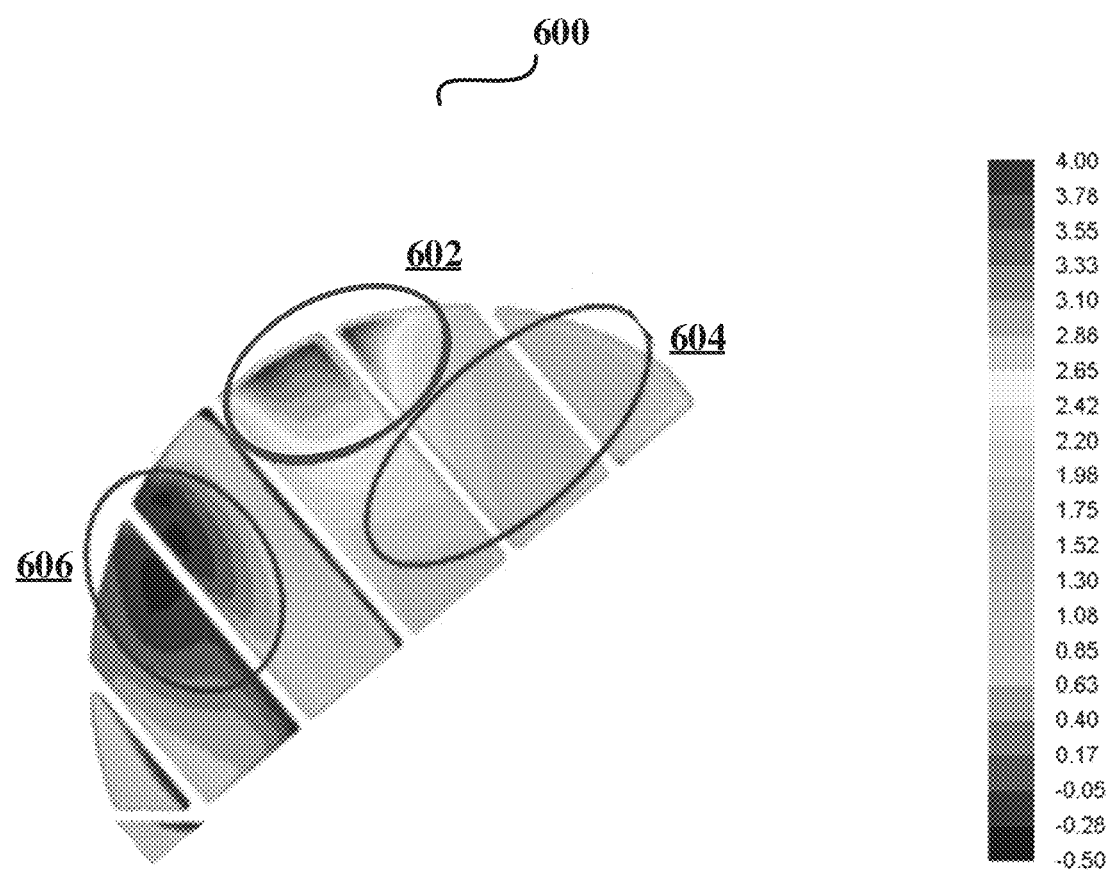
FIG. 6 depicts the worked model of the vertical bracket in the integrated oil separator in accordance with an exemplary embodiment of the invention.

FIG. 6 depicts the vertical bracket 600 through which the mixture passes before the filtration at the demister pads/wire mesh 112A. The analysis of a typical flow of the mixtures shows a non-uniform flow of the mixture at the vertical bracket 600. The Figure illustrates different regions of impact as the mixture passes through the vertical bracket 600. The region 602 indicates medium level flow concentration of the mixture at the vertical bracket. Similarly, the region 604 indicates lower concentration of the mixture as the mixture passes through the vertical bracket. The region 606 indicates high concentration of the mixture. The regions described herein indicates that the flow of the mixture is not uniform as the mixture passes through the vertical bracket 600 i.e. at the entrance of the mixture at the demister pads/wire mesh. The vertical bracket witnesses different concentration in different regions on the vertical bracket. The grey-scale bar indicator on the right side of the FIG. 6 shows different levels of concentration with respect to corresponding grey-scale. For better efficiency of the HVAC system, it is necessary that the flow of the mixture be uniform. The uniform flow also ensures that the refrigerant does not carry away large number of oil particles into the refrigerant outlet.

Figure 7:
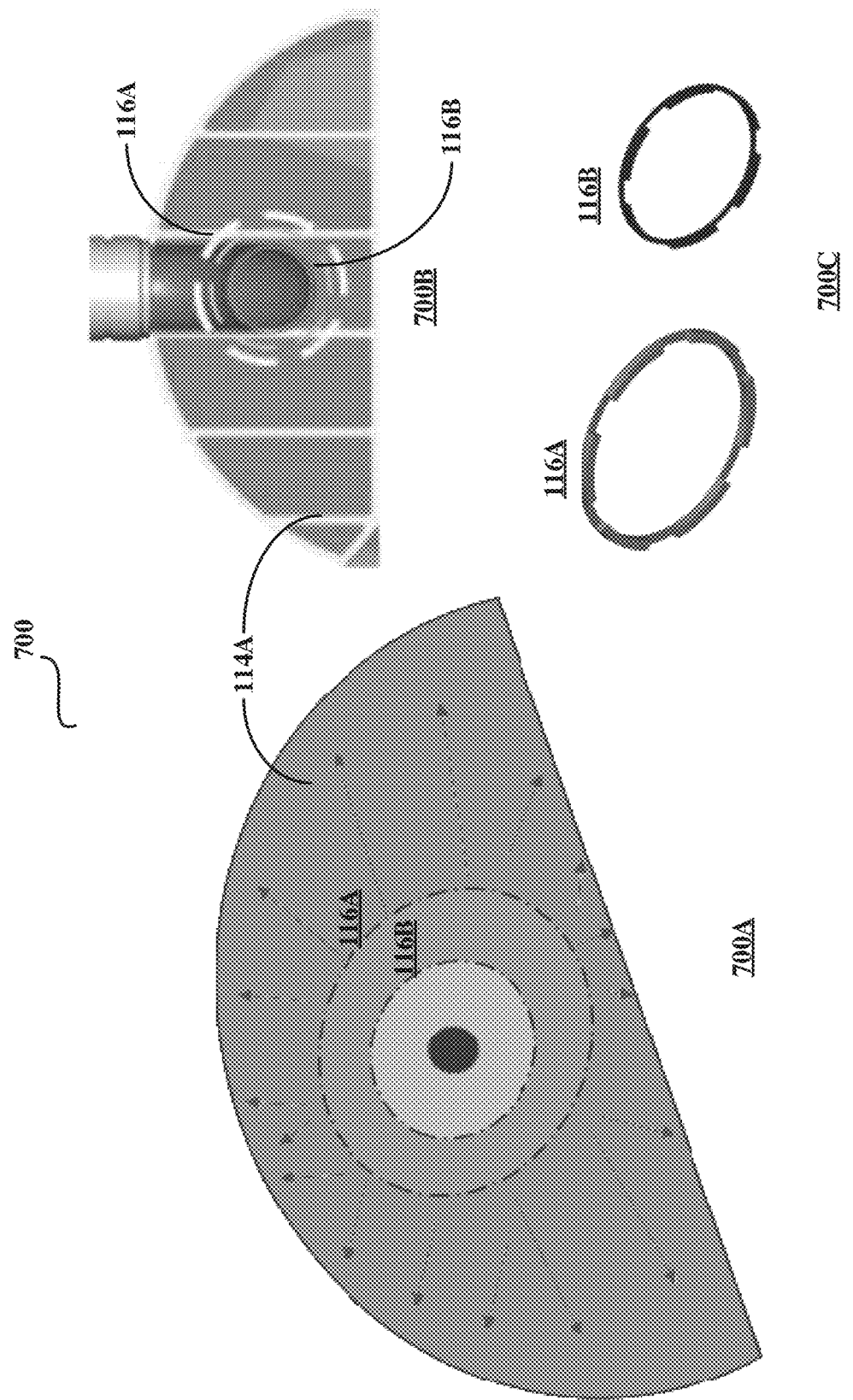
FIG. 7 depicts the wall of the integrated oil separator with intra-cut rings in accordance with an exemplary embodiment of the invention.

FIG. 7 depicts different views 700 of wall 114A. The wall 114A of the oil separator comprises two intra-cut rings 116A and 116B of different diameters. The intra-cut rings 116A and 116B are located on the wall 114 of the oil separator where the mixture strikes or impinges on the wall 114. The intra-cut rings are designed to make the flow of the mixture uniform such that the mixture is distributed uniformly and flows further for separation. FIG. 7 illustrates only two intra-cut rings. However, the number of intra-cut rings depends on the application of the oil separator and dimensions of the oil separator. The first intra-cut ring 116A has larger diameter than the second intra-cut ring 116B. The first intra-cut ring 116A and the second intra-cut ring 116B control the direction of the flow of the mixture to make it uniform as shown in 700A, The wall 114A in 700B shows the side view of the oil separator including the wall 114A with the first intra-cut ring 116A and second intra-cut ring 116B. The first intra-cut ring 116A and the second intra-cut rings are shown separately in 700C. The first intra-cut ring and the second intra-cut ring display discontinuities equally spaced apart. However, the spacing between the discontinuities may not be equal or regular.

Figure 8:
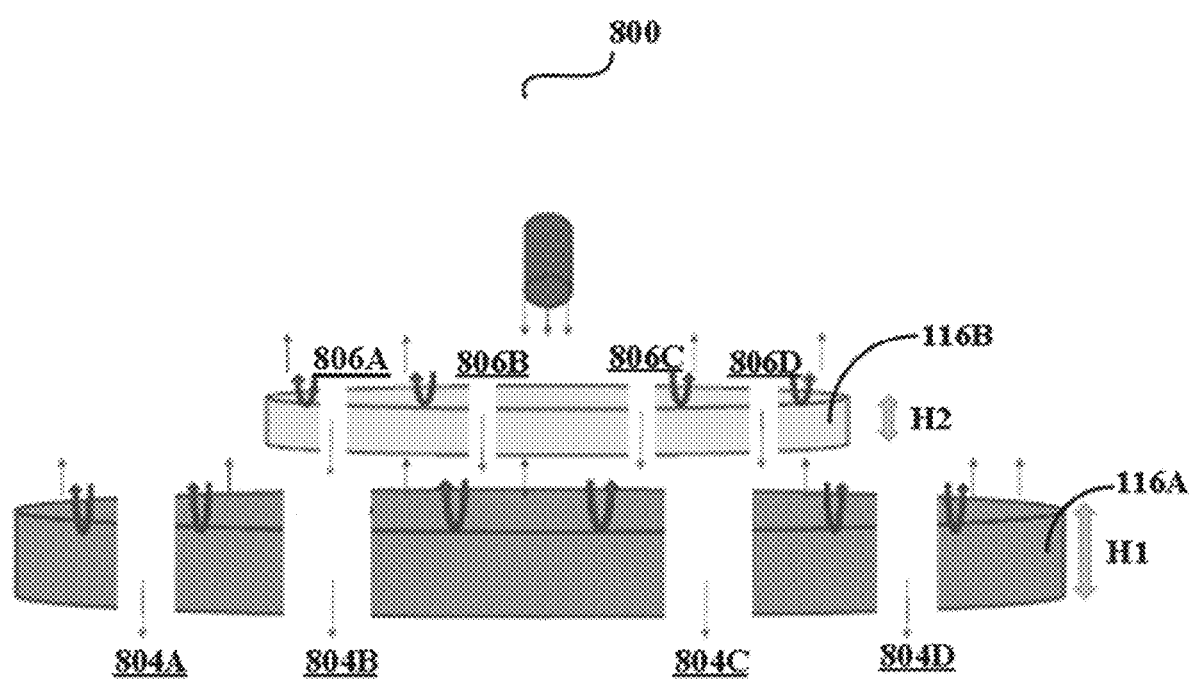
FIG. 8 depicts the detailed view of the intra-cut rings in accordance with an exemplary embodiment of the invention.

FIG. 8 describes an embodiment of the invention with detailed description of embossed structure such as the intra-cut rings described above. The first intra-cut ring 116A and the second intra-cut ring 116B may be present on the one or more walls of the integrated oil separator. The first intra-cut ring 116A and second intra-cut ring 116B are described in detail herein. It is to be noted that the number of intra-cut rings can be more or less depending on the application defining the flow of the mixture inside the integrated oil separator. In this exemplary embodiment, the first intra-cut ring comprises openings/spaces which are spaced apart from each other. The function of the openings 804A, 804B, 804C, 804D is to regulate the incoming flow of the mixture from the compressor. The openings may be of equal dimensions or may be of different dimensions. Further, the thickness/height H1 of the first intra-cut 116A ring may vary based on the application. Similarly, the thickness/height of the second intra-cut ring H2 may also vary based on the application. Similarly, the dimensions of the second intra-cut rings may be different from that of first intra-cut ring. That is, the openings 806 A, 806B, 806C, 806D may be similar to or different from the openings in the first intra-cut ring. In another embodiment of the invention, the dimensions of the openings, thickness/height, angle with respect to the wall of each intra-cut ring may be relative to each other. In other words, the dimensions of the first intra-cut ring may vary with respect to the dimensions of the second intra-cut ring and vice versa. There may be a plurality of intra-cut rings which may be designed such that dimensions of each intra-cut ring depends upon the dimensions of other intra-cut rings. The rings may also have tapered slope with respect to wall of the oil separator. It may be further noted that the intra-cut rings may be circular, elliptical in shape. The first intra-cut ring may be concentric with the second intra-cut rings. Various other dimensions of the embossed structure on the wall is also within the scope of the invention. As an exemplary embodiment, 30% of the mixture rebounds on impact and 70% of the mixture passes through intra-cuts on plurality of rings. The amount of mixture distributed in the central portion and along the walls vary based on the design of intra-cut rings.

This embodiment of the invention is advantageous over the existing internal oil separators in that due to the intra-cut rings present on the walls of the integrated oil separator, the oil and the refrigerant mixture strikes the walls and is not allowed to immediately retreat from the impact of collision on the wall. Rather, the flow of the mixture is regulated by spaced apart openings or intra-cuts in plurality of rings. Consequently, the mixture flows along the walls and is distributed in the entire oil separator i.e. along the walls and also along the central portion of the oil separator. This in turn provides near ideal speed to pass through the vertical brackets 112B.

In CFD analysis, the uniformity of the flow is determined based on the Flow Distribution Index (FDI) which is given by following expression:

$$\frac{1}{A} \int_A \left[1 - 0.5\left[\frac{Vi}{Vavg} - 1\right]\right] dA$$

Where, $\gamma$=Flow Distribution Index (FDI)
A=Surface area of corresponding face zone (m2)
Vi=Local axial velocity through area dA (m/s)
Vavg=Average axial velocity on corresponding face zone (m/s)

Flow Distribution Index gives the deviation from the average velocity. If the flow is perfectly uniform, the value is close to 1, otherwise it is less than 1. Values between 0.9 to 1 indicate good uniformity, values between 0.8 to 0.9 indicate average uniformity and those below 0.8 indicate poor uniformity. Using the intra-cut rings as described in the present invention FDI close to 1 can be achieved.

Figure 9:
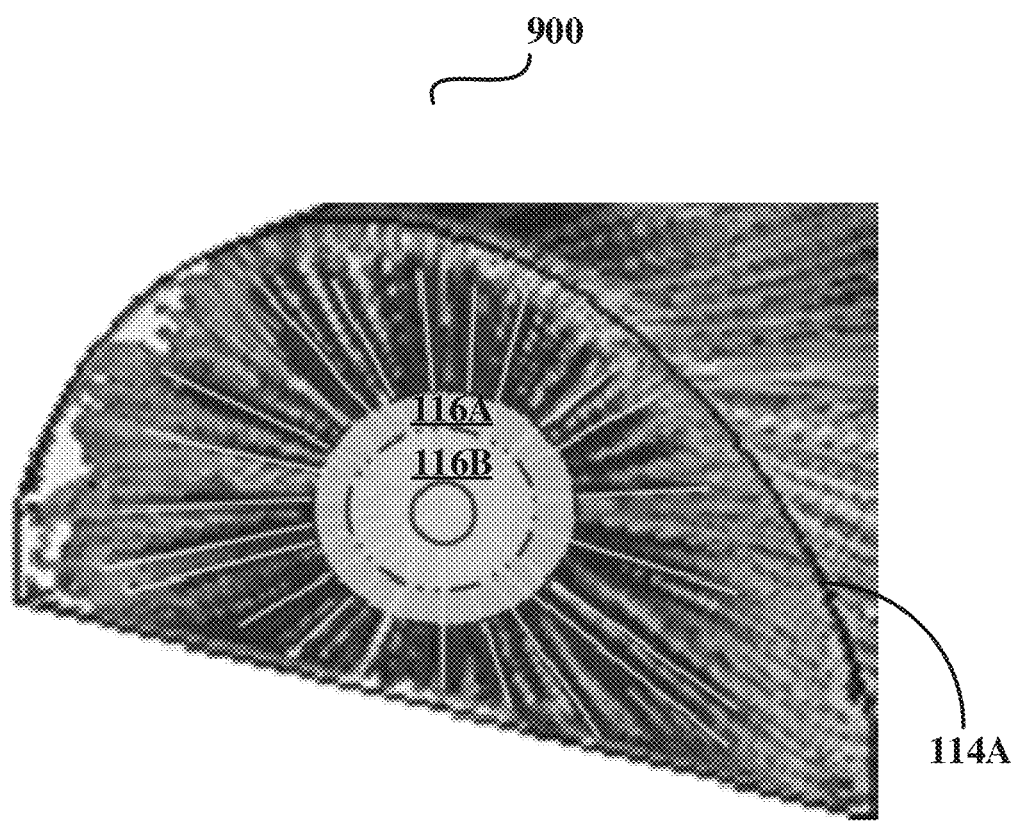
FIG. 9 depicts front view of the wall with intra-cut rings showing the flow of the mixture in the integrated oil separator in accordance with an exemplary embodiment of the invention.

FIG. 9 describes a side view 900 of the integrated oil separator indicating the first intra-cut ring 116A and second intra-cut ring 116B. FIG. 9 further displays the flow of the mixture through the intra-cut rings 116A and 116B as discussed above. It may be noted that the mixture impinges on the intra-cut rings which control the flow of the mixture through the spacings. Accordingly, the mixture does not flow in a reverse direction immediately after striking the wall. The mixture makes a passage through the intra-cut spaces and spreads radially as shown in the FIG. 9. Rest of the mixture flows in the central portion of the oil separator. The mixture flowing radially on the wall is distributed along the wall and flows through the top and bottom portion of the oil separator. The radial spread of the mixture on the wall is dependent on the dimensions of the intra-cut rings and the spacings provided therein. In an embodiment of the invention, the spacings between the intra-cut rings may be angular with respect to the wall. In an alternative embodiment, the spacings may be of different dimensions and angular orientations.

The invention is described taking into account the exemplary structure of intra-cut rings on the one or more walls. However, instead of the rings with intra-cuts, various other shapes such as ellipse, square, rectangle, triangle may also form part of the embossed structure depending upon the application of the oil separator and are within the scope of the invention. Also, the structure and dimensions applicable to the intra-cut rings may be designed for different other shapes of the embossed structure.

This embodiment of the invention allows uniform flow where a percentage of the mixture in the inlet 102 reverses through the central portion of the oil separator and impacts largely on the middle portion of the vertical brackets. Further, due to the flow of the mixture of the walls through the intra-cut rings, another portion of the mixture flows over the wall and spreads uniformly along the walls and flows through top and bottom portion of the oil separator. The flow of the mixture in such a way provides a technical advantage that the flow of the mixture and the separation of the oil from the mixture becomes uniform. The uniform flow allows efficient working of the HVAC system since the oil particles in the refrigerant are largely reduced.

Figure 10:
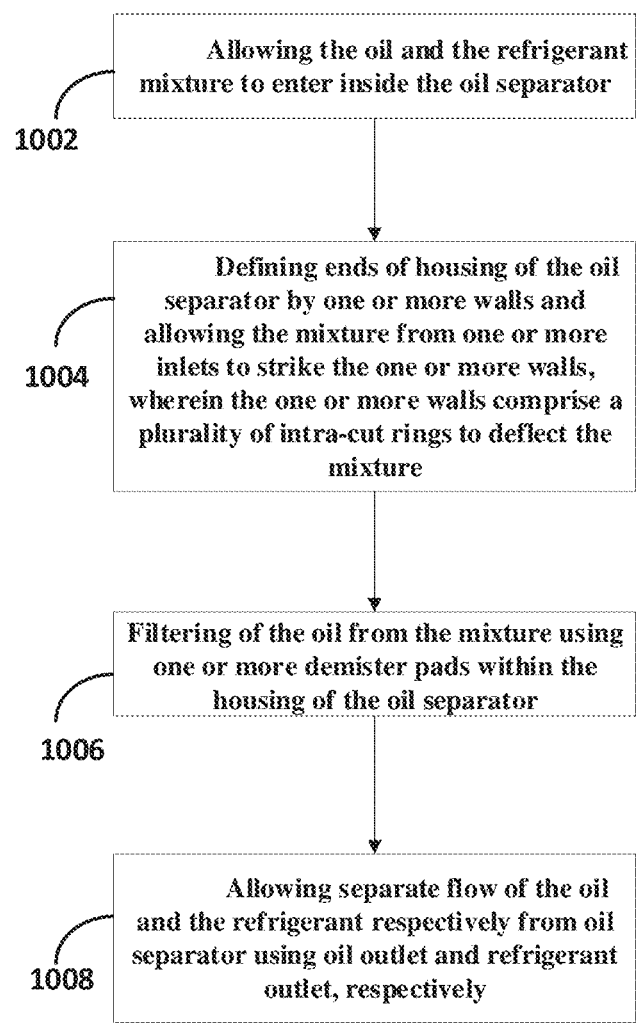
FIG. 10 depicts an exemplary flowchart illustrating a method to perform the invention according to an exemplary embodiment of the invention.

FIG. 10 depicts a flowchart outlining the features of the invention in an exemplary embodiment of the invention. The method flowchart describes a method being performed to control the flow of the oil and refrigerant mixture to increase the efficiency of the refrigeration system. The method starts at 1002 by allowing the oil and the refrigerant mixture to enter inside the oil separator through inlet 102. This is explained in greater detail in FIGS. 2-5 above.

At step 1004, the ends of the housing are defined in the oil separator by one or more walls. The oil and the refrigerant mixture entering the oil separator strikes the walls 114. Each of the one or more walls 114 comprises a plurality of intra-cut rings 116 to deflect the mixture received from the inlet 102. The same is described above with reference to FIG. 3-7 above.

At step 1006, the oil is filtered and separated from the refrigerant using demister pads and the wire meshes 112A. This has been discussed in greater details in FIGS. 3-7 above.

At step 1008, the oil and refrigerant are separated, wherein the oil flows through the oil outlet 110 and the refrigerant escapes through the refrigerant outlet 108.

The present invention is applicable in various industries/fields such as, but is not limited to, hospitality industry, residential complexes, offices, universities, hospitals, colleges, homes and any such industry/field that is well known in the art and where the HVAC systems are used.

The embodiments of the invention discussed herein are exemplary and various modification and alterations to a person skilled in the art are within the scope of the invention. Though the present invention has been described considering an exemplary refrigeration system, still the invention is applicable to all the condensers which can incorporate the internal oil separators.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. An oil separator for separating oil from refrigerant associated with a condenser in a heating, ventilation, and air conditioning (HVAC) system, the oil separator comprising:
   one or more inlets to allow oil and refrigerant mixture to enter inside the oil separator;
   one or more walls defining ends of a housing of the oil separator, the mixture from the one or more inlets striking the one or more walls, wherein the one or more walls comprise a plurality of intra-cut rings to deflect the mixture;
   one or more demister pads within the housing of the oil separator to allow the filtration of the oil from the mixture; and
   an oil outlet and a refrigerant outlet configured to allow separate flow of the oil and the refrigerant respectively from the oil separator.

2. The oil separator according to claim 1, wherein the oil separator is an integrated oil separator having a common dome with a condenser or the oil separator is internal to shell of the condenser.

3. The oil separator according to claim 1, wherein the one or more walls are configured to partially separate the oil from the mixture once the mixture strikes the one or more walls.

4. The oil separator according to claim 3, wherein the oil is further separated from the mixture by the virtue of gravity and filtration by the one or more demister pads.

5. The oil separator according to claim 1, wherein the plurality of intra-cut rings are discontinuous along the circumference of each of the intra-cut rings.

6. The oil separator according to claim 5, wherein the discontinuities on the circumference of the intra-cut rings are of same dimensions.

7. The oil separator according to claim 5, wherein the discontinuities on the circumference of the intra-cut rings are of different dimensions.

8. The oil separator according to claim 1, wherein the thickness/height of each of the plurality of intra-cut rings is of different dimension.

9. The oil separator according to claim 1, wherein the intra-cut rings are placed at an angle on the one or more walls.

10. The oil separator according to claim 1, wherein the intra-cut rings are circular or elliptical in shape.

11. An oil separator for separating oil from refrigerant associated with a condenser in a heating, ventilation, and air conditioning (HVAC) system, the oil separator comprising:
    one or more inlets to allow oil and refrigerant mixture to enter inside the oil separator;
    one or more walls defining ends of a housing of the oil separator, the mixture from the one or more inlets striking the one or more walls, wherein the one or more walls comprise a plurality of intra-cut rings to deflect the mixture;
    one or more demister pads within the housing of the oil separator to allow the filtration of the oil from the mixture; and
    an oil outlet and a refrigerant outlet configured to allow separate flow of the oil and the refrigerant respectively from the oil separator;
    wherein the plurality of intra-cut rings are concentric with each other.

12. The oil separator according to claim 11, wherein the thickness/height of the circumference of each concentric intra-cut ring increases with increase in the diameter of each intra-cut ring.

13. A method of separating oil from the oil and refrigerant mixture in an oil separator, the method comprising:
    allowing the oil and the refrigerant mixture to enter inside the oil separator through one or more inlets;
    allowing the mixture from the one or more inlets to strike the one or more walls in housing defining ends of a housing of the oil separator, wherein the one or more walls comprise a plurality of intra-cut rings to deflect the mixture;
    filtering of the oil from the mixture using one or more demister pads within the housing of the oil separator; and
    separating flow of the oil and the refrigerant respectively from oil separator using oil outlet and refrigerant outlet, respectively.

14. The method according to claim 13, wherein the plurality of intra-cut rings are discontinuous along the circumference of each of the intra-cut rings and are designed to allow uniform velocity of the mixture towards the one or more demister pads.

15. The method according to claim 14, wherein the discontinuities on the circumference of the intra-cut rings are of same dimensions.

16. The method according to claim 14, wherein the discontinuities on the circumference of the intra-cut rings are of different dimensions.

17. The method according to claim 13, wherein the intra-cut rings are placed at an angle on the one or more walls, wherein the intra-cut rings are circular or elliptical in shape.

18. A method of separating oil from the oil and refrigerant mixture in an oil separator, the method comprising:
    allowing the oil and the refrigerant mixture to enter inside the oil separator through one or more inlets;
    allowing the mixture from the one or more inlets to strike one or more walls in housing defining ends of a housing of the oil separator, wherein the one or more walls comprise a plurality of intra-cut rings to deflect the mixture;
    filtering of the oil from the mixture using one or more demister pads within the housing of the oil separator; and
    separating flow of the oil and the refrigerant respectively from oil separator using oil outlet and refrigerant outlet, respectively;
    wherein the plurality of intra-cut rings are concentric with each other.

19. The method according to claim 18, wherein the thickness/height of the circumference of each concentric intra-cut ring increases with increase in the diameter of each intra-cut ring.

* * * * *